A. BARR & W. STROUD.
OPTICAL INSTRUMENT.
APPLICATION FILED JULY 3, 1911.
1,031,769.
Patented July 9, 1912.
2 SHEETS—SHEET 1.
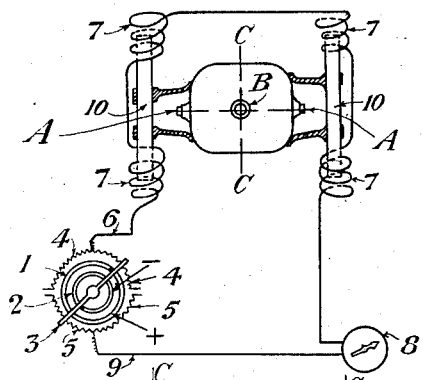
FIG: 1.
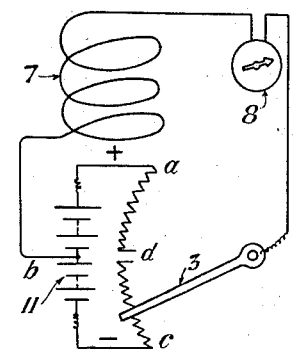
FIG: 2.
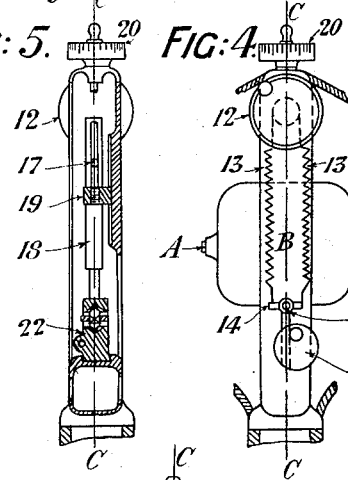
FIG: 5. FIG: 4.
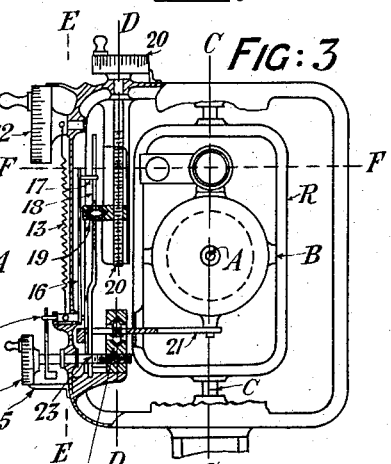
FIG: 3.
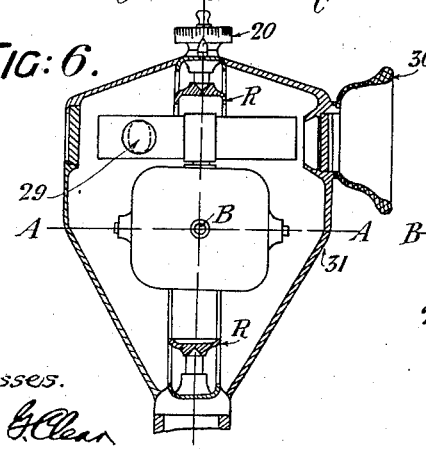
FIG: 6. FIG: 7.
Witnesses.
Myron G. Clear
T. W. Fowler Jr.
Inventors.
Archibald Barr.
William Stroud.
By T. Walter Fowler
atty A. BARR & W. STROUD.
OPTICAL INSTRUMENT.
APPLICATION FILED JULY 3, 1911.
1,031,769.
Patented July 9, 1912.
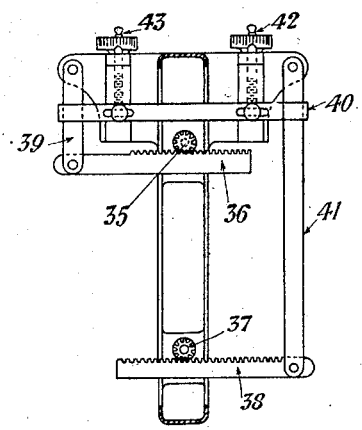
FIG: 9.
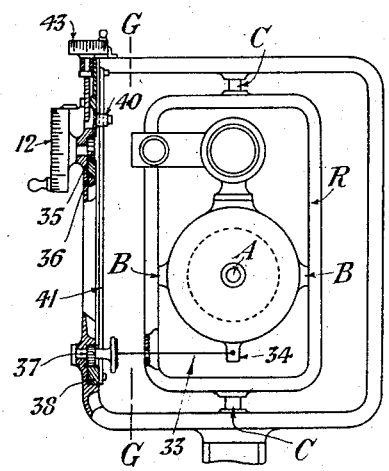
FIG: 8.
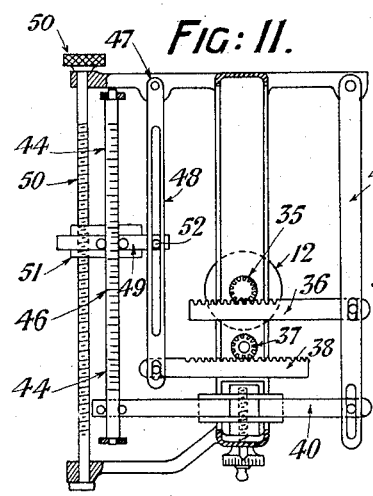
FIG: 11.
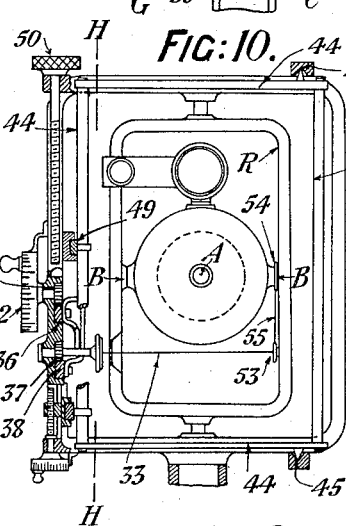
FIG: 10.
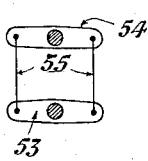
FIG: 12.
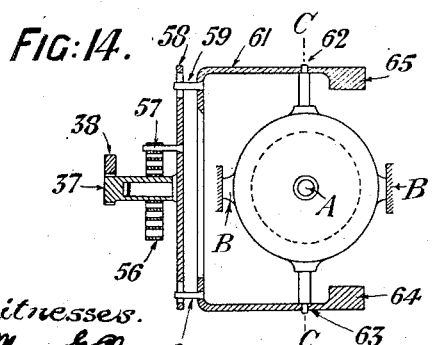
FIG: 14.
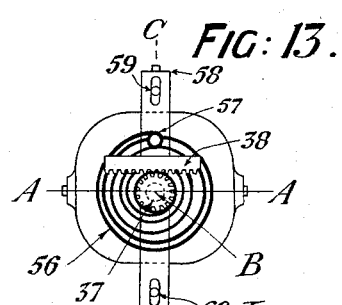
FIG: 13.
Witnesses.
Myron G. Clear
T. W. Fowler, Jr.
Inventors.
Archibald Barr.
William Stroud.
By T. Walter Fowler
atty.

UNITED STATES PATENT OFFICE.

ARCHIBALD BARR AND WILLIAM STROUD, OF ANNIESLAND, GLASGOW, SCOTLAND.

OPTICAL INSTRUMENT.

1,031,769.  Specification of Letters Patent.  Patented July 9, 1912.

Application filed July 3, 1911. Serial No. 636,629.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in Optical Instruments, (for which we have made applications for patents in Great Britain, No. 17291, bearing date July 21, 1910, and No. 27436, bearing date November 25, 1910,) of which the following is a specification.

This invention relates to the production of apparatus, for use in imparting to a telescope or other observing, or sighting device, hereinafter referred to as a sighting device, the movements required to keep it directed upon a moving target.

According to this invention, the apparatus comprises a gyroscope, whose speed is maintained constant, say, by a centrifugal or other governor, associated with means for applying forces or couples to the gyroscope to cause it to partake of a precessional rotation about a vertical axis proportional to the rate of change in the movement of the target in order to keep the angle between the target line and the gyroscopic axis (or rather its horizontal projection) constant. In the description which follows, it will be assumed that this angle is to be maintained at zero (although any other constant angle would serve for the purpose).

The invention also contemplates associating with apparatus according to this invention, means for indicating the magnitude of the forces or couples applied to the gyroscope, or for indicating the rate of precession of the gyroscope.

In describing this invention it will be assumed that the apparatus is, for instance, fitted on board a ship. Initially when the ship's deck is level, let A be the approximately horizontal axis of rotation of the gyroscope, B a horizontal axis perpendicular to A, and C a vertical axis, these three mutually perpendicular axes passing through one and the same point coinciding with (or slightly above) the center of gravity of the gyroscope. We now provide appliances for producing a couple about the axis B, the resulting effect upon the gyroscope being to produce a precessional rotation about the vertical axis C. This couple is adjusted in magnitude until the precessional motion is equal to the rate of change of bearing of the target.

In the description which follows, some examples of the construction of apparatus, embodying the characteristic features of the invention will be described with reference to the accompanying drawings, in which:—

Figures 1 and 2 are diagrammatic views showing how the force may be applied to the gyroscope and varied by electro-magnetic means. Fig. 3 shows one form of apparatus for applying forces to the gyroscope and varying their magnitude by mechanical means. Figs. 4 and 5 are vertical sections corresponding respectively to the lines D D and E E in Fig. 3. Fig. 6 is a central vertical section of the view represented by Fig. 3 and Fig. 7 is a horizontal section at the level of the line F F. Figs. 8 to 14 show alternative methods of applying mechanical forces to the gyroscope and varying their magnitude for one and the same position of the working head. Fig. 8 shows a vertical section perpendicular to the axis of rotation of the gyroscope and Fig. 9 a vertical section through the line G G. Fig. 10 shows a section similar to Fig. 8 but with certain modifications to enable the correction for deflection to be determined and Fig. 11 is a vertical section through the line H H. Fig. 12 shows an elevation of part of the instrument. Figs. 13 and 14 show views of an alternative method of applying forces to the gyroscope. Fig. 13 is a view perpendicular to the axis B and Fig. 14 is a view perpendicular to the axis A.

In all the figures A A represents the axis of spin of the gyroscope, B B the axis of the applied couple and C C a vertical axis.

In Fig. 1 a ring 1 is connected to the positive terminal of a source of E. M. F. and a ring 2 to the negative terminal. A bar 3, arranged so as to be capable of rotating about its center, carries brushes bearing upon the rings 1 2 and the resistance 4 4 and 5 5. The brush on ring 1 is electrically connected to the brush upon 4, and the brush on 2 to that on 5. The current enters by the ring 1, passes to 4 thence by the lead 6 to coils of wire 7, then through a galvanometer 8 and back to the negative terminal by the route 9, 5, 2. The coils 7 are carried by an outer casing, not shown in the diagram, capable of being turned in azimuth by the operator. Attached to the frame of the gyroscope are two approximately equal vertical magnets 10, 10, the one with the north pole, the second with the south pole uppermost (so that the pair are astatic so far as the earth's magnetism is concerned. The direction of the current through the four coils 7 is such that the electro-magnetic forces conspire to produce a couple about the axis B, i. e. the one magnet is pulled downward and the second is pushed upward. These forces will consequently produce a precession of the whole gyroscope about the axis C C. Thus if the gyroscope is accurately balanced when there is no current in 7, the rate of precession will be proportional to the strength of the current and will be capable of being reversed by reversing the current. In this way the rate of precession is determined by the position of the arm 3 and can be read off (if necessary at a distance) by the galvanometer 8. The apertures of the coils 7 are much larger than the magnets so that the gyroscope carrying the magnets is free to precess to a certain amount with reference to the coils without coming in contact with them. When, however, the gyroscope is precessing the outer casing the instrument supporting the coils is supposed to be rotated by hand about a vertical axis so as to leave the gyroscope free.

Fig. 2 shows an alternative method for varying the magnitude and direction of the current. The four coils are here represented diagrammatically by the single coil 7. A battery 11 has one terminal connected to one end of a resistance $a\,d$, the other terminal being joined to one end of a resistance $c\,d$. The middle $b$ of the battery is joined to 7 and one lead from the galvanometer 8 is joined to the center of the pivoted arm 3. Thus the direction and magnitude of the current through 7 and 8 depends upon the position of 3; if 3 makes contact at $a$ the maximum current will flow from 8 to 7 whereas if 3 is placed at $d$ no current will flow, and if at $c$ the maximum current will flow from 7 to 8.

One method of applying a mechanical force to the gyroscope is shown in Figs. 3, 4 and 5. An adjustable and graduated head 12 has attached to it two helical springs 13, whose lower ends are fastened to a lever 14, whose fulcrum is at 15. Rigidly fixed to this lever is an arm 16 provided with a pin 17 working in a slot of the arm 18 whose fulcrum 19 can be raised or lowered by the screw 20. The lower end of 18 engages in a slot in the lever 21 whose fulcrum 22 can be shifted by means of the screw 23 operated by the head 24. The other end of the arm 21 is forked into a projection upon the lower part of the frame of the gyroscope. It will thus be clear that by turning the head 12 we shall apply a force to the gyroscope but for one and the same position of the head the magnitude of this force can be varied by shifting the position of the fulcra 19 and 22 of the arms 18 and 21 by means of the heads 20 and 24. We may regard the head 20 as that by means of which allowance is made for range when the head 12 is graduated to indicate correction for deflection. When the head 20 is put at the indication corresponding to a given range the graduation of 12 may conveniently represent in appropriate symbols the rate of change of bearing, or a separate scale may be attached to 12 for this purpose. The object of the head 24 which shifts the fulcrum 22 of the arm 21 is to provide a small correction for the effect of wind, or the temperature of the explosive or the density of the air, or for all three of these variables, which may for the purpose in view be combined into a single co-efficient and the head 24 may be set with reference to its pointer 25 to indicate this value.

Figs. 6 and 7 show in sectional elevation and plan respectively a sighting device and one method of obtaining a view of a mark attached to the gyroscope simultaneously with the target. This mark or slit 26 may take the form of a clear vertical line on a black background. A prism 27 reflects the light from this mark to the lens 28—the mark being situated at the principal focus of the lens—and thence to the partially silvered parallel glass plate 29. The eye of the observer is placed opposite a rubber eyepiece 30 (fixed to an outer case 31) so that a direct view of the target is obtained through the plate 29 from which a view of the mark is also obtained by reflected light. This optical mechanism can, if desired, be attached to the frame R (Fig. 3) instead of to the frame of the gyroscope. As the gyroscope precesses it will be necessary from time to time to shift the case 31 in azimuth and in order to provide a simple means of indicating to the eye of the observer when such shift is desirable we may fix to the outer case 31 a frame 32 carrying two vertical strips of differently colored glass, 32$^a$ and 32$^b$, say red and green, with a clear space between them; when the gyroscope occupies its symmetrical position with reference to the case the light illuminating the mark or slit 26 will be white, but as the gyroscope precesses to the one side, or the other, the color will change to red or green, intimating to the observer that the case should be shifted to the right or left according to the nature of the color.

In Figs. 8 and 9 the force is applied to the gyroscope through the torsion of a wire 33 fixed to the lower part 34 of the frame of the gyroscope. The working head 12 with scale and fixed index actuates a pinion 35 gearing into a suitably guided rack 36. The motion of this rack is communicated to the pinion 37 by the rack 38 by means of the system of lever 39, link 40, and lever 41. In this way a rotation of the pinion 35 is magnified up twofold or threefold in the motion of the pinion 37 and moreover for one and the same position of 35 we may magnify or diminish the effect upon 37 by varying the position of either or both of the ends of the link 40 by means of either of the screws 42 and 43.

Fig. 10 shows in sectional elevation perpendicular to the axis A of the gyroscope and Fig. 11 in sectional elevation through the line H H (Fig. 10) a form of instrument suitable for determining the correction for deflection when the time of flight of the shot (or the range of the target) is known. Where possible the parts in these figures having the same functions as those represented in Figs. 8 and 9 are indicated by the same letters. The chief feature distinguishing Figs. 10 and 11 from Figs. 8 and 9 consists in the provision of a frame 44 pivoted about a vertical axis 45, the portion 46 of the frame 44 remote from the pivot being provided with a uniform scale (representing the time of flight of the shot) whose zero would be at the same level in the figure as the axis 47 of the lever 48. The vertical adjustment of the sliding link 49 connecting the pieces 44 and 48 is accomplished by the screw 50 which can raise or lower the nut 51 supporting the link 49. It will thus be clear that if the working head 12 be turned through an angle $\varphi$ the link 49 is moved horizontally through a distance proportional to $\varphi$ and the angle turned through by the pinion 37 is proportional to $\frac{\varphi}{T}$ where T represents the distance between the pivots 47 and 52. Thus $\frac{\varphi}{T}$ is proportional to the rate of charge of bearing or $$\frac{\varphi}{T} \propto \frac{d\theta}{dt} \therefore \varphi \propto T\frac{d\theta}{dt}$$

or becomes a measure of the correction for deflection and the head 12 may be graduated accordingly. In Figs. 10 and 12 there is shown a modified method of imparting the couple to the gyroscope which produces the precession. The pinion 37 is attached to one end of a wire (or spring) 33 whose other end is fastened to an arm 53 connected to the arm 54 (which is attached to the frame of the gyroscope) by two parallel links 55.

In Figs. 13 and 14 there is represented an alternative way of communicating a mechanical couple to the gyroscope. The rack 38 rotates the pinion 37 (as before); attached to the pinion is a spiral spring 56 whose free end is fastened to a pin 57 projecting from the arm 58 which is pivoted at its center. In two slots upon 58 project two pins 59 and 60 attached to a light frame 61, which is pivoted freely to the gyroscope frame 62 and 63, and is balanced by counterpoises at 64 and 65. On rotating 37 the spring, say, is wound up, the arm 58 tends to turn, 59 is pushed to the left and 60 to the right (Fig. 13) and the couple resulting therefrom is thereby transferred to the frame of the gyroscope.

We claim:

1. A gyroscope combined with a sighting device, means for applying forces or couples to the gyroscope to cause it to precess about a vertical axis, said sighting device being so mounted that its movements in azimuth are controlled by the precessional rotation of the gyroscope, and means for varying the magnitude of the forces or couples so as to adjust the precession to the rate required to maintain the sighting device directed upon a target having an azimuthal motion relatively to the station upon which the gyroscope is mounted.

2. A gyroscope, means for applying variable forces or couples to the gyroscope to cause it to precess about a vertical axis, and means for indicating the magnitude of the forces or couples applied, in combination with a sighting device mounted so that its movements in azimuth are controlled by the precessional rotation of the gyroscope, for the purposes set forth.

3. A gyroscope, electro-magnetic means for producing forces or couples for application to the gyroscope to cause it to precess about a vertical axis, in combination with a sighting device mounted so that its movements in azimuth are controlled by the precessional rotation of the gyroscope, for the purposes set forth.

4. A gyroscope, two approximately vertical magnets, one with the north pole the other with the south pole uppermost, attached to the frame of the gyroscope, coils, encircling but not touching the magnets, arranged so that when energized they apply a couple to the gyroscope and cause it to precess about a vertical axis, in combination with a sighting device mounted so that its movements in azimuth are controlled by the precessional rotation of the gyroscope, for the purposes set forth.

5. A gyroscope, electro-magnetic means adapted when energized to apply a couple to the gyroscope and cause it to precess about a vertical axis, means for controlling the direction and magnitude of a current for energizing the electro-magnetic means, in combination with a sighting device mounted so that its movements in azimuth are controlled by the precessional rotation of the gyroscope, for the purposes set forth.

6. A gyroscope, electro-magnetic means adapted when energized to apply a couple to the gyroscope and cause it to precess about a vertical axis, means for controlling the direction and magnitude of a current for energizing the electro-magnetic means, and means for indicating the rate of precession of the gyroscope, in combination with a sighting device mounted so that its movements in azimuth are controlled by the precessional rotation of the gyroscope, for the purposes set forth.

7. A gyroscope, electro-magnetic means adapted when energized to apply a couple to the gyroscope and cause it to precess about a vertical axis, means for controlling the direction and magnitude of a current for energizing the electro-magnetic means, and means for indicating the magnitude of the current, in combination with a sighting device mounted so that its movements in azimuth are controlled by the precessional rotation of the gyroscope, for the purposes set forth.

In testimony whereof we affix our signatures in presence of two witnesses.

ARCHIBALD BARR.
WILLIAM STROUD.

Witnesses:
 NEIL I. MACLEAN,
 A. A. PORTER.